United States Patent [19]
Peterson et al.

[11] Patent Number: 5,502,689
[45] Date of Patent: Mar. 26, 1996

[54] CLOCK GENERATOR CAPABLE OF SHUT-DOWN MODE AND CLOCK GENERATION METHOD

[75] Inventors: Joseph W. Peterson; Alan F. Hendrickson; Dale E. Gulick; Dean Grumlose, all of Austin, Tex.

[73] Assignee: Advanced Micro Devices, Inc., Sunnyvale, Calif.

[21] Appl. No.: 201,077

[22] Filed: Feb. 24, 1994

Related U.S. Application Data

[63] Continuation of Ser. No. 918,622, Jul. 21, 1992, abandoned.

[51] Int. Cl.$^6$ ............................ G04F 5/00; G06F 1/00
[52] U.S. Cl. ....................... 368/156; 364/707; 395/750
[58] Field of Search ................. 368/10, 66, 155–157, 368/200–204; 364/707; 395/750

[56] References Cited

U.S. PATENT DOCUMENTS

| | | | |
|---|---|---|---|
| 4,293,927 | 10/1981 | Hoshii | 364/900 |
| 4,317,181 | 2/1982 | Teza et al. | 364/707 |
| 4,365,290 | 12/1982 | Nelms et al. | 364/200 |
| 4,409,665 | 10/1983 | Tubbs | 364/707 |
| 4,686,386 | 8/1987 | Tadao | 307/269 |
| 4,758,945 | 7/1988 | Remedi | 364/200 |
| 4,979,143 | 12/1990 | Takano et al. | 364/900 |
| 5,148,380 | 9/1992 | Lin et al. | 364/707 |
| 5,237,699 | 8/1993 | Little et al. | 395/750 |

FOREIGN PATENT DOCUMENTS

| | | |
|---|---|---|
| 0229692 | 7/1987 | European Pat. Off. . |
| 2080585 | 2/1982 | United Kingdom . |
| 8802017 | 6/1983 | WIPO . |

*Primary Examiner*—Vit W. Miska
*Attorney, Agent, or Firm*—Jenkens & Gilchrist

[57] ABSTRACT

A clock generator and interrupt bypass circuit for use in reducing the power consumption of the electrical system in which they are implemented. The clock generator provides module clock signals for sequencing modules within the same electrical system, and is capable of generating those module clock signals when in an active mode, and of not generating those module clock signals when in a stand-by mode. The clock generator is further capable of providing a delay of a predetermined length from a request to enter shut-down mode to actual entry into shut-down mode, allowing time to prepare the electrical system for shut-down mode. The interrupt bypass circuit provides a means of leaving shut-down mode in the event that the relevant interrupt requests have been masked.

9 Claims, 7 Drawing Sheets

CLOCK GENERATOR CAPABLE OF SHUT-DOWN MODE AND CLOCK GENERATION METHOD

This is a continuation of Ser. No. 07/918,622, filed Jul. 21, 1992, now abandoned.

CROSS-REFERENCE TO RELATED APPLICATIONS

This application is related to the following U.S. Patent Applications:

| U.S. SERIAL NO. | TITLE | INVENTOR(S) |
| --- | --- | --- |
| U.S. Pat. No. 5,448,743 | General I/O Port Interrupt Mechanism | Gulick, et al. |
| U.S. Pat. No. 5,408,639 | Improved External Memory Access Control for a Processing Unit | Gulick, et al. |
| Ser. No. 07/917,488 | Method of Weak Pull-up Disable and Mechanism Therefor for Use with Microcontroller in Integrated Circuit and Cordless Telephone Using the Integrated Circuit | Bowles, et al. |
| Ser. No. 07/917,503 | Interrupt Mask Disable Circuit and Method | Bowles, et al. |
| Ser. No. 07/918,627 | Integrated Circuit and Cordless Telephone Using the Integrated Circuit | Gulick, et al. |
| Ser. No. 07/918,626 | Modulator Test System | Peterson, et al. |
| Ser. No. 07/918,625 | Keypad Scanner Process and Device and Cordless Telephone Employing the Mechanism | Gulick |
| U.S. Pat. No. 5,404,459 | Serial Interface Module and Method | Gulick, et al. |
| Ser. No. 07/918,631 | Low Power Emergency Telephone Mode | Peterson, et al. |
| Ser. No. 07/918,632 | In-Circuit Emulation Capability Mode in Integrated Circuit and Cordless Telephone Using the Integrated Circuit | Gulick, et al. |
| U.S. Pat. No. 5,420,904 | Signal Averager | Gulick |

All of the related applications are filed on even date herewith, are assigned to the assignee of the present invention, and are hereby incorporated herein in their entirety by this reference thereto.

BACKGROUND OF THE INVENTION

1. Field of the Invention

The present invention relates to clock driven electrical systems and, more particularly, to electrical circuits for use in reducing power consumption of clock driven electrical systems.

2. History of the Prior Art

The minimization of power consumption is an important objective of many electrical circuit designs. Reduced power consumption is generally desired for a number of reasons, one of which in the case of battery powered circuits, is to extend the life of the battery. In battery powered circuits, a reduction in power consumption of an electrical device is generally expected to extend the life of the battery powering that circuit. An extended battery life is useful in many applications. In the case of a battery powered circuit in a cordless telephone, for example, an extended battery life allows for longer idle time, that is, the period of time between uses.

As is generally known in the electrical art, the power consumption of an electrical system composed of a number of functional blocks may be controlled by use of a number of different power modes, some modes allowing certain functional blocks in the system to be disabled. These power modes may include a fully active mode wherein all functional blocks are active, partly active modes wherein only the functional blocks that are necessary for minimal operation are enabled, and a power-down mode wherein all functional blocks are disabled except those required to recognize key events that will force the system back into an active mode. It is the power-down mode that consumes the least power.

A known method of conserving power in an electrical system is by effectuating a power-down mode during which the internal clock signals that sequence the functional blocks within the electrical system are disabled. Also well known to those skilled in the art is the method of disabling, during the power-down mode, the oscillator or clock generator circuit from which the internal clock signals are derived. Without an active clock signal, the functional blocks are disabled and power consumption is minimized.

Entry into power-down mode may be under software control. Selection of the power-down mode by a software program causes a system controller to begin an internal countdown of a predetermined number of system clock cycles after which the oscillator or clock generator circuit is disabled. This countdown period may be used by the microprocessor to prepare for power-down mode before the clock is stopped. The countdown is generally accomplished by activating an internal counter. For example, a countdown of 256 clock cycles may be performed by an eight-bit counter. This countdown may be canceled if an interrupt occurs during the countdown period.

The power-down mode may be exited by the effectuation of a number of conditions such as, for example, a hardware reset or other type of interrupt.

Although the power-down mode is an effective means of conserving power, it has heretofore had a number of shortcomings and deficiencies. One of these deficiencies is the expense associated with the use of a counter to provide the delay from a request to enter power-down mode to the disablement of the oscillator.

Another shortcoming and deficiency of the use of power-down mode to conserve power is the possibility of errors caused by unstable clock pulses generated when the oscillator is first turned on.

Also, as the entry into power-down mode may be software controlled, there has been encountered problems heretofore where software error or noise results in the accidental entry of the device into the power-down mode resulting in the inadvertent disabling of most functional blocks.

Another problem associated with the use of the power-down mode is the possibility of a premature entry into the power-down mode which results in insufficient time to complete necessary housekeeping operations. This premature entry may be caused by a previous request to enter power-down mode from a different software routine.

Still another problem encountered is the possibility of the device entering the power-down mode without any means to exit the power-down mode and return to an active power mode. Such a possibility may exist, for example, when the program, prior to entry into power-down mode, fails to enable the interrupts that would signal the processor to exit the power-down mode.

SUMMARY OF THE INVENTION

The present invention overcomes the shortcomings and deficiencies of the prior art by providing a clock generator capable of being placed into a shut-down mode, during which mode the clock generator does not generate any clock signals. The present invention may be used to reduce power consumption by disabling output clock signals in response to a request to enter shut-down mode, and enabling the output clock signals in response to a request to exit shut-down mode. Also, power consumption may be reduced by disabling the oscillator during shut-down mode and enabling the oscillator during an active mode.

The clock generator includes structure for receiving a shut-down entry request signal, structure responsive to the shut-down entry request signal, for placing the clock generator into a shut-down mode, and structure for delaying operation of the structure for placing for a predetermined minimum amount of time after receipt by the structure for receiving of the shut-down entry request signal. In embodiments of the present invention, the structure for delaying may include a shut-down entry delay timer which generates a stop-oscillator signal after passage of the predetermined minimum amount of time, and the structure for placing may include an oscillator which is stopped in response to the assertion of the stop-oscillator signal. The shut-down entry delay timer may be pulse driven. Also, the predetermined minimum amount of time may be defined by the amount of time between two pulses. These pulses may be derived from a non-variable clock signal.

In certain embodiments of the present invention, the clock generator may include structure for producing at least one output clock signal, structure for disabling the structure for producing upon reception of a disable activation signal, structure for receiving a shut-down entry request signal, and structure for verifying that the received shut-down entry request signal meets a predetermined protocol requirement. The structure for verifying may include at least two registers and may generate the disable activation signal upon verification that a received shut-down entry request signal does meet the predetermined protocol requirement, which disable activation signal is received by the structure for disabling. In certain embodiments of the present invention, the structure for verifying may further include an interlock mechanism capable of detecting writes to the at least two registers. Also, one of the at least two registers may be a dummy register. The interlock mechanism may prevent write access to one of the at least two registers unless the predetermined protocol requirement is met. The predetermined protocol requirement may be a predetermined number of writes in a predetermined order to the at least two registers.

The clock generator of the present invention may provide at least one output clock signal and include structure for receiving a shut-down entry request signal, structure for producing a clock signal, which structure for producing a clock signal is activated upon the assertion of the shut-down exit request signal, structure for producing at least one output clock signal derived from the clock signal, and structure for delaying the producing of the at least one output clock signal for a counted length of time from the assertion of the shut-down exit request signal. In certain embodiments of the present invention, the structure for producing the clock signal may include an oscillator and the structure for producing the at least one output clock signal may include a clock divider. The means for delaying may include a counter which is initialized upon the assertion of the shut-down exit request signal and which generates a clock-valid signal after a counted length of time. The clock-valid signal may be conducted to the clock divider which is activated upon receipt of the clock-valid signal.

The present invention also provides a system for controlling at least one output clock signal which includes a clock generator circuit and an interrupt bypass circuit. The clock generator circuit may include structure for receiving a disable request signal, structure for stopping the at least one output clock signal after a predetermined length of time after receiving the disable request signal, structure for receiving an enable request signal, and structure for starting the at least one output clock signal after receiving the enable request signal. The interrupt bypass circuit may include structure for generating the enable request signal in response to at least one interrupt request signal which may be generated even if the interrupt request signal has been masked.

Also provided by the present invention is a system for controlling at least one output clock signal which includes structure for receiving a disable request signal, structure for receiving an enable request signal, and structure for stopping the at least one output clock signal after a predetermined length of time after receiving the disable request signal. The structure for stopping the at least one output clock signal may include a structure for not stopping the at least one output clock signal if the enable request signal is received after receipt of the disable request signal and before the expiration of the predetermined length of time.

Furthermore, the present invention provides a method for controlling at least one output clock signal. The method provided by the present invention includes the steps of receiving a disable request signal, stopping the at least one output clock signal after a predetermined length of time after receiving the disable request signal, receiving an enable request signal, and starting the at least one output clock signal after receiving the enable request signal. In certain embodiments of the present invention, the step of starting the at least one output clock signal includes the steps of starting a first clock signal, and starting the at least one output clock signal after a delay following the step of starting the first clock signal. The at least one output clock signal may be derived from the first clock signal.

The step of stopping the at least one output clock signal may include the steps of verifying that the disable request signal satisfies a predetermined protocol requirement and processing the disable request signal only if the disable request signal satisfies the predetermined protocol requirement.

According to certain teachings of the present invention, the step of stopping the at least one output clock signal may include the step of not stopping the at least one output clock signal if the enable request signal is received after receiving the disable request signal and before the expiration of the predetermined length of time.

In certain embodiments of the present invention, the step of stopping the at least one output clock signal may include the step of stopping the at least one output clock signal after the predetermined length o time following the most recent assertion of the disable request signal.

According to certain teachings of the present invention, the method for controlling at least one output clock signal may also include the step of generating the enable request signal in response to at least one interrupt request signal, where the enable request signal is generated even if the at least one interrupt request signal has been masked.

Accordingly, it is an object of the present invention to provide a clock generator capable of shut-down mode that may be used to conserve the power consumed by the electrical system in which the clock generator operates.

Another object of the present invention is to provide the capability of preventing the accidental entry into shut-down mode.

Still yet another object of the present invention is to provide the ability to exit shut-down mode even though all interrupt request signals have been masked.

A further object of the present invention is to provide the capability of allowing a minimum amount of time to prepare for entry into shut-down mode after the most recent request to enter shut-down mode.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION

Figure 1:
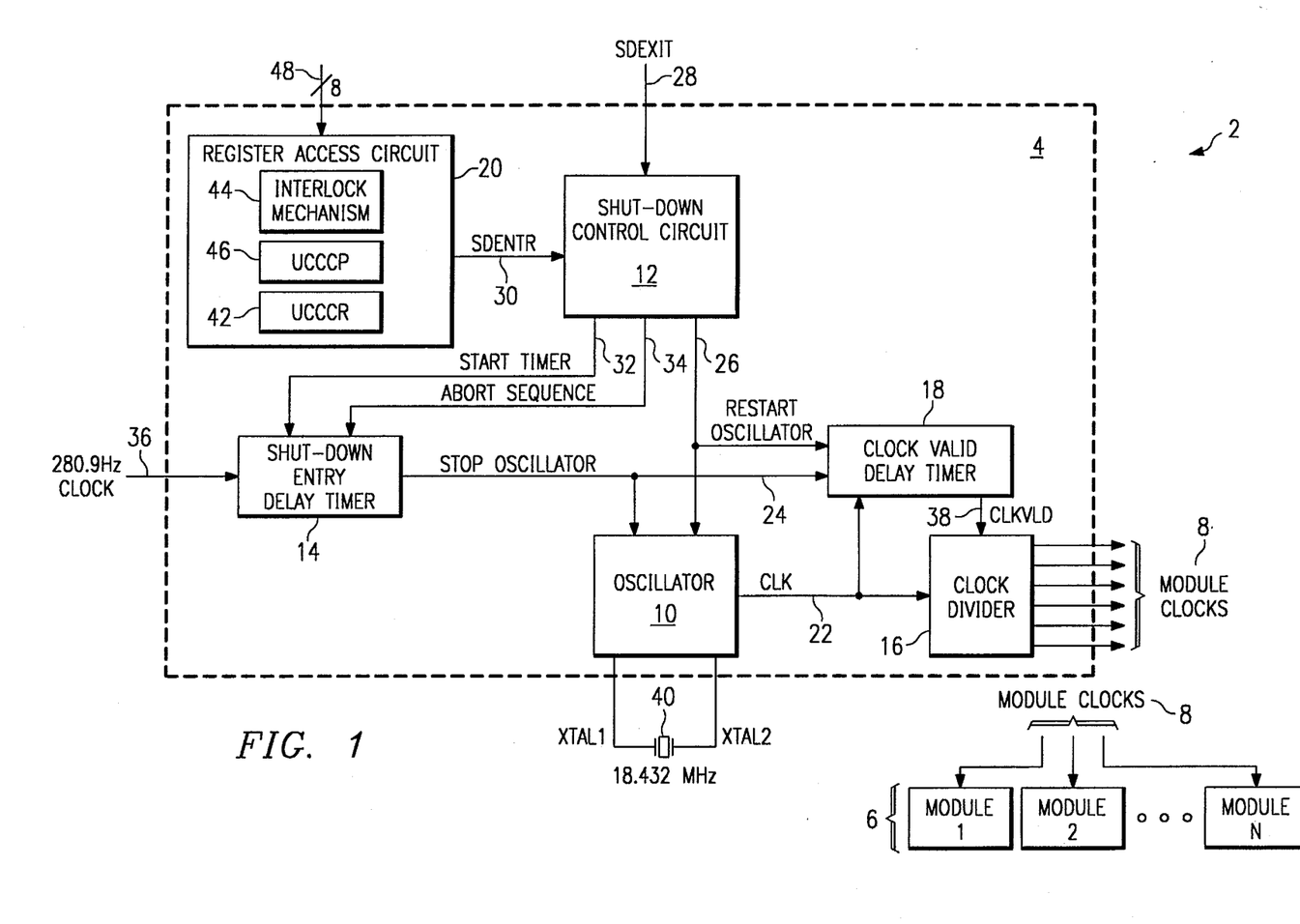
FIG. 1 is a block diagram of an electrical system employing one embodiment of a clock generator according to the teachings of the present invention.

Referring now to the drawings, there is shown in FIG. 1 an electrical system 2 employing a clock generator 4 capable of shut-down mode according to the teachings of the present invention. The electrical system 2 may include one or more modules 6, each of which may be sequenced by one of the module clock signals 8 generated by the clock generator 4. The clock generator 4 may operate in an active mode or may be software programmed into a shut-down mode. The capability of programming the clock generator 4 into a shut-down mode allows for the minimization of power consumption for the electrical system 2 in which the clock generator 4 operates. In its active mode, the clock generator 4 outputs a number of module clock signals 8 for use in sequencing modules 6 within the electrical system 2. In its shut-down mode, the clock generator 4 disables all module clock signals 8, which effectively disables all modules 6 sequenced by those module clock signals, and thereby reduces the power consumed by those modules. Further power reduction during shut-down mode is accomplished by stopping the oscillator 10 from which the module clock signals 8 are derived.

In its preferred embodiment, the clock generator 4 includes the six functional blocks shown in FIG. 1: an oscillator 10, shut-down control circuit 12, a shut-down entry delay timer 14, a clock divider 16, a clock valid delay timer 18, and register access circuit 20.

The oscillator 10 provides an outgoing clock signal CLK on line 22 that is conducted to the clock divider 16 and to the clock valid delay timer 18. The generation of CLK by the oscillator 10 may be accomplished by means typical of oscillator circuits in the semiconductor art. For example, the oscillator 10 may be connected to an external parallel resonant crystal 40 via external lines XTAL1 and XTAL2 as shown in FIG. 1, or the oscillator 10 may be connected to an external clock source (not shown) via external line XTAL2.

In one embodiment of the present invention, the oscillator 10 is enabled and generates the CLK signal while in its active mode, and is disabled and does not generate the CLK signal while in its shut-down mode. In the shut-down mode, the operation of the oscillator may be disabled in response to the activation of the STOP OSCILLATOR signal conducted on line 24 from the shut-down entry delay timer 14. Once in shut-down mode, the oscillator may be restarted upon the assertion of the RESTART OSCILLATOR signal conducted on line 26 from the shut-down control circuit 12.

As previously mentioned, the placement of the oscillator 10 into an active or shut-down mode is effected by control signals received from the shut-down control circuit 12 and the shut-down entry delay timer 14. The shut-down control circuit 12 may be responsive to signals SDEXIT received on line 28, the assertion of which indicates a request to exit shutdown, and SDENTR received on line 30, the assertion of which indicates a request to enter shut-down mode. In response to these signals, the shut-down control circuit 12 generates control signals including the outgoing START TIMER signal conducted on line 32 which is received by the shut-down entry delay timer 14, and the RESTART OSCILLATOR signal conducted on line 26 which is received by the oscillator 10 and the clock valid delay timer 18. Another such control signal is the ABORT SEQUENCE signal conducted on line 34 which is received by the shut-down entry delay timer 14.

The shut-down entry delay timer 14 provides a time delay between a request to enter shut-down mode and the disablement of the oscillator 10. This time delay may be used to allow one or more of the modules 6 in the electrical system 2 to be programmed to its idle state, or to complete any necessary housekeeping operations. In one embodiment of the present invention, the shut-down entry delay timer 14 receives an incoming clock signal on line 36. It also receives from the shut-down control circuit the START TIMER signal and the ABORT SEQUENCE signal via lines 32 and 34, respectively. In response to these signals, the shut-down entry delay timer 14 provides a STOP OSCILLATOR signal on line 24 conducted to the oscillator 10 and the clock valid delay timer 18.

The shut-down entry delay timer 14 may provide a 3.56 msec to 7.12 msec delay after the assertion of the START TIMER signal before asserting the STOP OSCILLATOR signal. In order to provide this delay, the shut-down entry delay timer 14 receives a 280.9 Hz clock signal on line 36 and generates an internal pulse in response to each rising edge of the 280.9 Hz clock signal. Thus, an internal pulse is generated every 3.56 msecs. This pulse signal (not shown) is hereinafter referred to as the 3.56 msec carry out signal. After the assertion of the START TIMER signal, the shut-down entry delay timer 14 asserts the STOP OSCILLATOR signal only after the second of such pulses is generated following the assertion of the START TIMER signal. Therefore, a user will have at least 3.56 msecs from the time entry into shut-down mode is requested until the system enters shut-down mode to program modules into an idle state and to perform any other necessary housekeeping routines.

It should be noted that the use of a slow clock already existing within the system, such as the 280.9 Hz clock shown in FIG. 1, is an efficient and cost-savings means by which to provide a delay before entry into shut-down mode. The use of an existing slow clock eliminates the need to incorporate a more expensive multiple-bit counter in order to divide a faster system clock.

The clock divider 16 receives the clock signal CLK on line 22 from the oscillator 10 and may divide it into a number of module clock signals 8 of different frequencies which may be used to sequence a number of modules 6 within the same electrical system 2. The clock divider 16 disables the module clock signals 8 when CLK is stopped, and enables the module clock signals when CLK is restarted and the clock valid signal CLKVLD received on line 38 is asserted. It should be noted that even if the oscillator 10 is running, the clock divider will not generate the module clock signals until the CLKVLD signal on line 38 has been asserted.

The clock valid delay timer 18 provides a delay from the time the oscillator 10 is enabled until the module clock outputs are enabled. This delay provides time for the CLK signal to stabilize before its use by the clock divider 16 in the generation of the module clock signals. This delay prevents errors caused by unstable clock pulses. In one embodiment, a counter (not shown) internal to the clock valid delay timer 18 is cleared in response to the assertion of the STOP OSCILLATOR signal generated by shut-down entry delay timer 14. Further, the counter begins its countdown in response to the assertion of the RESTART OSCILLATOR signal generated by the shut-down control circuit 12. Upon completion of the countdown, the clock valid delay timer 18 asserts the CLKVLD signal on line 38 which is received by the clock divider 16. If CLKVLD is asserted and the oscillator 10 is enabled, the clock divider generates the module clock signals 8 used to sequence modules 6 within the electrical system 2.

Entry into the shut-down mode is under software control and may be initiated by writing the appropriate data via data bus 48 to a shut-down control register, such as the UCCCR register 42 shown in FIG. 1. For example, entry into shut-down mode may be initiated by setting the most significant bit of the shut-down control register, hereinafter referred to as UCCCR[7]. Write access to the UCCCR register may be protected by an access control mechanism to avoid placing the clock generator 4 in shut-down mode inadvertently. Such an access control mechanism may include an interlock mechanism 44 along with a dummy register such as the shut-down protection register UCCCP 46, both of which are shown in the register access control circuit 20 in FIG. 1. The interlock mechanism 44 recognizes writes to the UCCCP register 46 and the UCCCR register 42, and will allow data to be written to the UCCCR register only upon completion of a particular shut-down register access sequence. This sequence may include a predetermined number of writes to the UCCCP and UCCCR registers in a predetermined sequence. Upon the successful writing of the appropriate data to the UCCCR register, the SDENTR signal may be asserted on line 30 signaling a request to enter the shut-down mode. This access protection scheme avoids the inadvertent placement of the clock generator into shut-down mode, and thus reduces the risk of accidental clock stoppage due to possible software problems.

Based on the foregoing, it should now be clear that the present invention provides a clock generator capable of being software programmed into a shut-down mode that can be used to reduce power consumption in an electrical system. The present invention includes an oscillator, a shut-down control means and a first time delay means. Embodiments of the present invention may also include a clock divider, a second time delay means and register access protection means.

The operation of the clock generator 4 of FIG. 1 during entry into shut-down mode and exit from shut-down mode will now be explained with reference to the waveforms shown in FIG. 2. Before time t0, the clock generator 4 is in its active mode, the oscillator 10 is enabled, and the module clock signals 8 are enabled. It is assumed that at time t0, UCCCR[7] is set by software. The setting of UCCCR[7] causes the register access circuit 20 to assert the SDENTR signal on line 30. In response to the assertion of SDENTR, the shut-down control circuit 12 asserts the START TIMER signal on line 32 which is conducted to the shut-down entry delay timer 14. The assertion of the START TIMER signal will cause the shut-down entry delay timer 14 to assert the STOP OSCILLATOR signal upon the second internal 3.56 msec carry out pulse following the shut-down entry request. Time t1 marks the first of such pulses, and time t2 marks the second. Accordingly, time t2 will occur between 3.56 to 7.12 msecs after t0. At time t2, the shut-down entry delay timer asserts the STOP OSCILLATOR signal on line 24 which results in the disabling of the oscillator 10. Further, at time t2 all module clock outputs are disabled, and the clock valid signal is cleared.

Figure 2:
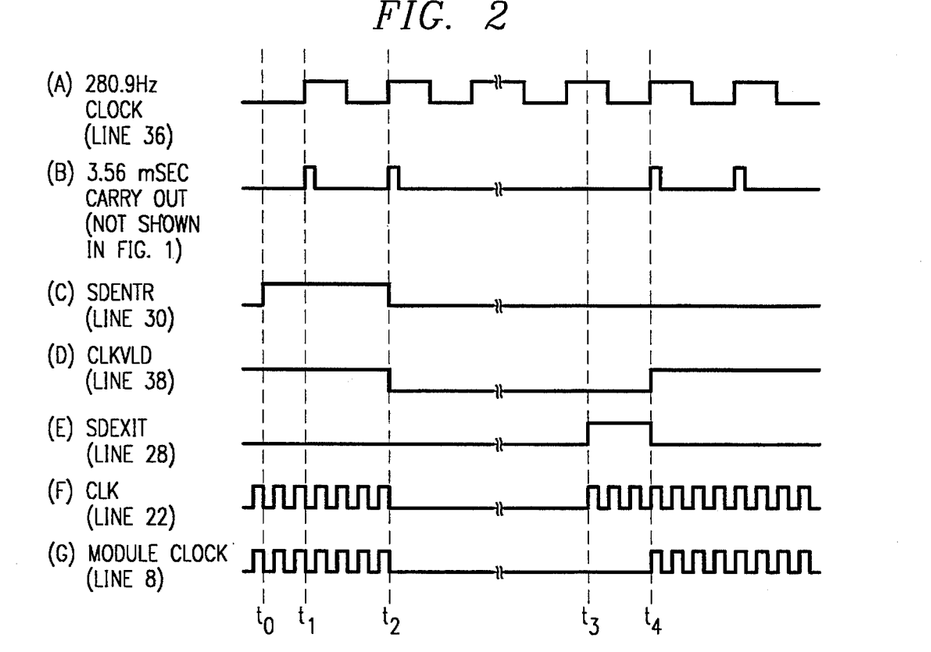
FIG. 2 shows the timing of the clock generator shown in FIG. 1.

Exit from shut-down mode may be initiated by the assertion of SDEXIT on line 28, shown in FIG. 2 as occurring at time t3. If the clock generator 4 is in shut-down mode, the assertion of SDEXIT will cause the shut-down control circuit 12 to assert the RESTART OSCILLATOR signal on line 26, which will enable the oscillator 10 and activate the counter internal to the clock valid delay timer 18. Further, the assertion of SDEXIT may also clear UCCCR[7]. At time t4, the counter internal to the clock valid delay timer 18 completes a countdown. This causes the assertion of CLKVLD on line 38 which, in turn, causes the clock divider 16 to enable the module clock outputs 8.

Figure 3:
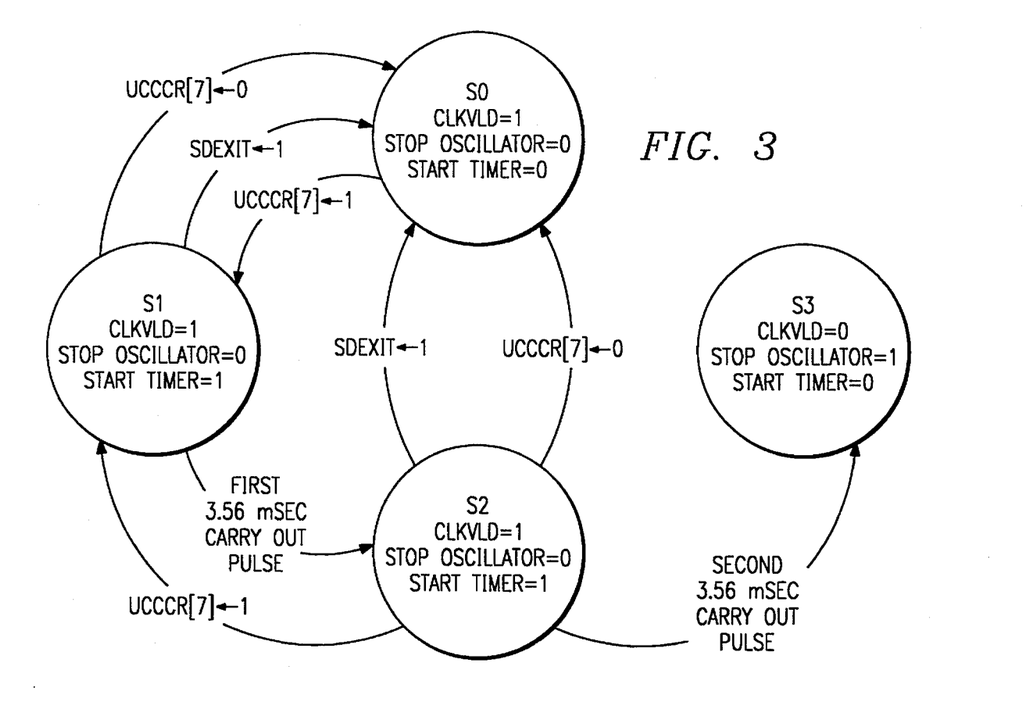
FIG. 3 is a state diagram of the entry into shut-down mode by the clock generator shown in FIG. 1.

Further aspects of clock generator according to the teachings of the present invention are explained with reference to the state diagram in FIG. 3. State S0 of the state diagram represents the active mode of the clock generator. While in state S0, the oscillator 10 is enabled and all module clock signals 8 generated therefrom are enabled. The shut-down sequence may be initiated by a successful setting of UCCCR

[7] which causes the assertion of SDENTR on line 30. The initiation of the shut-down sequence is shown as state S1 in FIG. 3. Following the initiation of the shut-down sequence, the shut-down entry delay timer transitions to state S2 upon the first subsequent 3.56 msec carry out pulse. The second 3.56 msec pulse causes the transition from state S2 to state S3 where state S3 represents the placement of the clock generator into shut-down mode. Upon entry into shut-down mode, the shut-down entry delay timer 14 generates a STOP OSCILLATOR signal to the oscillator 10, the CLKVLD signal is cleared, and UCCCR[7] is cleared.

This shut-down sequence may be restarted or aborted by a number of conditions occurring after the initiation of the shut-down sequence and before the clock generator 4 actually enters the shut-down mode. For example, the shut-down sequence may be aborted and the clock generator placed in state S0 if SDEXIT is asserted or if UCCCR[7] is cleared by software while the clock generator is in state S1, that is, at any time after SDENTR has been asserted and before the first subsequent 3.56 msec carry out pulse. These conditions, that is the assertion of SDEXIT or the clearing of UCCCR [7], may also cause the shut-down sequence to be aborted if they occur during state S2, that is, after the first but before the second 3.56 msec carry out pulse following the assertion of SDENTR.

Furthermore, the shut-down sequence may be re-initiated if the UCCCR[7] is reset by software while the clock generator 4 is in state S2, that is, after the first 3.56 msec carry out pulse but before the second such pulse. Thus, a particular software routine will have at least 3.56 msecs to prepare for entry into shut-down mode, even though its shut-down entry request was made while the clock generator was preparing to enter shut-down mode pursuant to a previous shut-down entry request. This re-initiation capability is important because, due to the complexity of some software programs, it is possible that more than one software routine may independently request that the system enter the shut-down mode. Without the re-initiation capability, the routine requesting entry into shut-down mode will not have sufficient time to prepare for shut-down if the request is made while the clock generator is processing a previous request for entry into shut-down mode made by another software routine.

From the foregoing detailed description, it can thus be seen that the present invention provides a clock generator capable of generating module clock signals used to sequence modules within the same electrical system while in an active mode, and of not generating those module clock signals when in a shut-down mode. Further, the clock generator of the present invention provides a predetermined time delay from a request to enter shut-down mode to the disabling of the module clock signals, providing time to prepare the modules for shut-down and to complete any necessary housekeeping routines. Certain embodiments of the present invention may also provide a time delay from the enabling of the oscillator to the starting of the module clock signals for allowing time for the oscillator output to stabilize. Also, certain embodiments may provide a shut-down access protection means for preventing the inadvertent placement of the electrical system into a shut-down mode. Furthermore, certain embodiments may provide a means for aborting the shut-down entry sequence and returning to an active mode after entry into shut-down mode has been requested and before the oscillator has been disabled. Still furthermore, certain embodiments may provide a means for delaying the disabling of the oscillator until a predetermined time after the most recent request to enter shut-down mode has been made.

Figure 4:
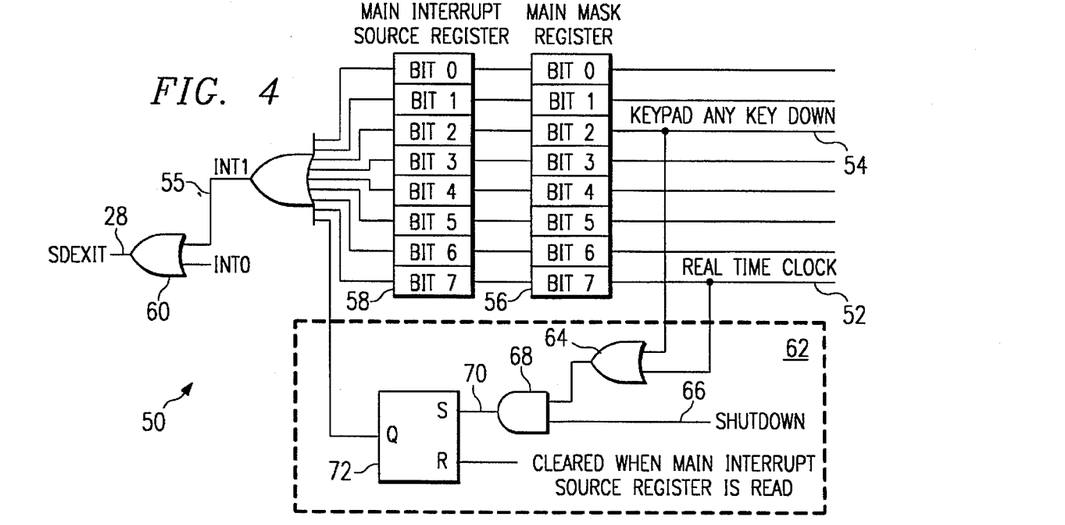
FIG. 4 is a detailed block diagram of an interrupt enable bypass circuit according to the teachings of the present invention.

A further aspect of the present invention is the interrupt enable bypass circuit. Such a circuit provides a means of leaving shut-down mode even if all interrupts have been disabled. An embodiment of such an interrupt enable bypass circuit is shown in FIG. 4 operating in an interrupt controller circuit 50 typical of those in the digital logic design art. The interrupt controller circuit is capable of receiving a number of interrupt requests from internal or external sources, such as the REAL TIME CLOCK interrupt request conducted on line 52 or the KEYPAD ANY KEY DOWN interrupt request conducted on line 54. Further, in response to the incoming interrupt requests, the interrupt controller circuit 50 is capable of generating an interrupt signal such as INT1 on line 55.

Incoming interrupt request signals are typically ANDed with corresponding mask signals from the Main Mask Register 56. Thus, an interrupt request signal will be recognized only if its corresponding bit in the Main Mask Register 56 has been set. If the corresponding bit has not been set, the interrupt request signal will not be forwarded past the Main Interrupt Mask Register and thus will not cause the assertion of the INT1 signal. The outputs of the Main Interrupt Mask Register 56 are conducted through the Main Interrupt Source Register 58, and then ORed together to generate the INT1 signal on line 55. The Main Interrupt Source Register 58 may be read to determine which unmasked interrupt request has been asserted.

The INT1 signal on line 55 is conducted to an OR gate 60, the output of which is the SDEXIT signal on line 28 which is conducted to the shut-down control circuit 12 shown in FIG. 1. As previously explained, the assertion of SDEXIT signals the clock generator 4 to exit shut-down mode.

The interrupt enable bypass circuit 62 provides a means of generating the SDEXIT signal even though all interrupt request signals have been masked. Interrupt request signals, such as the REAL TIME CLOCK signal conducted on line 52 and the KEYPAD ANY KEY DOWN signal conducted on line 54, are further conducted to an OR gate 64, the output of which is ANDed to a shut-down status signal on line 66. The shut-down status signal is high if the clock generator is in shut-down mode, and is low otherwise. The output of the AND gate 68 will be high if the clock generator is in shut-down mode and either the REAL TIME CLOCK signal or the KEYPAD ANY KEY DOWN signal has been asserted. The zero to one transition of the AND gate output on line 70 will cause the assertion of the output of the SR-latch 72 which is ORed with the outputs of the Main Interrupt Source Register 58 to generate the INT1 interrupt signal. As previously explained, the assertion of INT1 causes the assertion of the SDEXIT signal on line 28. Thus, SDEXIT may still be asserted in response to certain interrupt requests, such as the REAL TIME CLOCK or KEYPAD ANY KEY DOWN interrupt requests, even though the request signals have been masked.

Based on the foregoing, it may be seen that the interrupt bypass circuit 62 provides a means for the exit from shut-down mode even though all interrupt request signals have been masked. This is important because of the danger that the software program in use may not prevent the possibility that all interrupts have been masked before the program requests an entry into shut-down mode, thus leaving no means by which to exit shut-down mode.

The foregoing description shows only certain particular embodiments of the present invention. However, those skilled in the art will recognize that many modifications and variations may be made without departing substantially from the spirit and scope of the present invention. Accordingly, it should be clearly understood that the form of the invention described herein is exemplary only and is not intended as a limitation on the scope of the invention.

Figure 5:
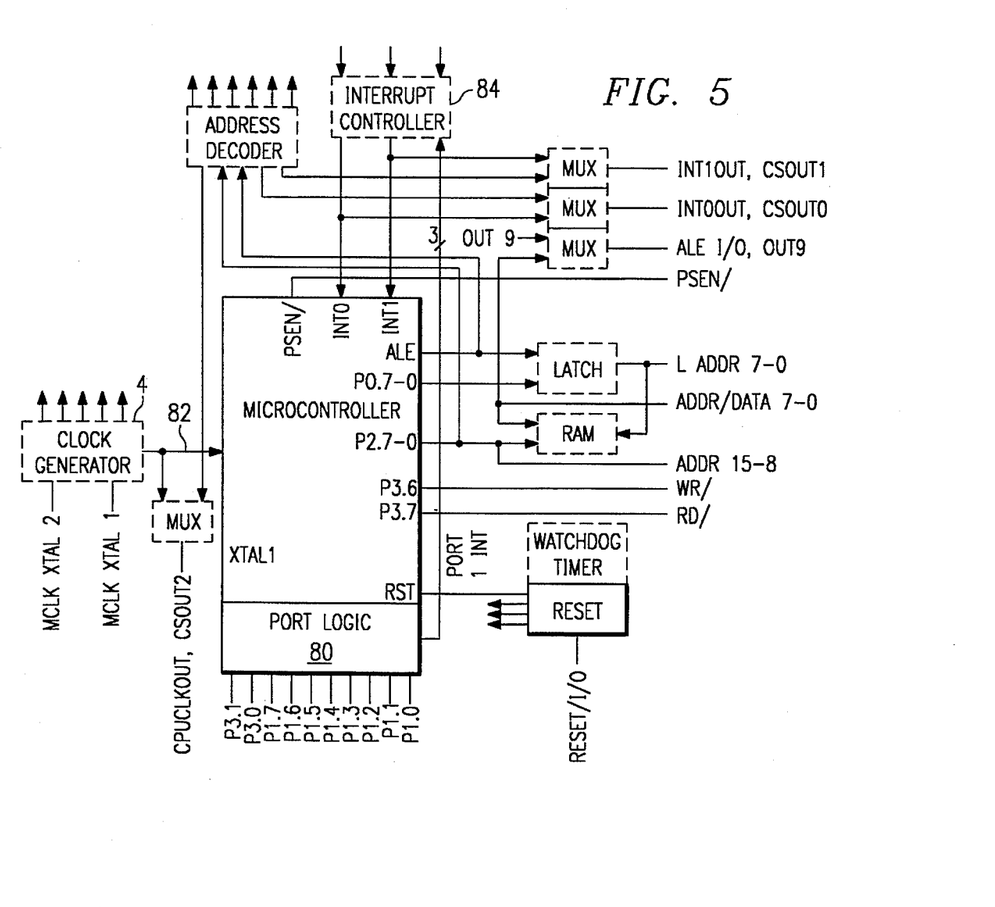
FIG. 5 is a block diagram of an electrical system in which a clock generator and interrupt bypass circuit according to the teachings of the present invention has been implemented, along with a microcontroller.

Furthermore, it should be understood that the clock generator and interrupt bypass circuit of the present invention may be implemented in a variety of systems. For example, the clock generator and interrupt bypass circuit may be used in an electrical system which also includes a microcontroller, such as the Advanced Micro Devices 80C51 80 as shown in FIG. 5. In this configuration, the clock generator 4 may provide a clock signal on line 82 for sequencing the microcontroller 80. Further, the microcontroller 80 may run software program that controls the placement of the system into shut-down mode. The interrupt bypass circuit may be included in the interrupt controller module 84 used for generating interrupts to the microcontroller 80.

Figure 6A:
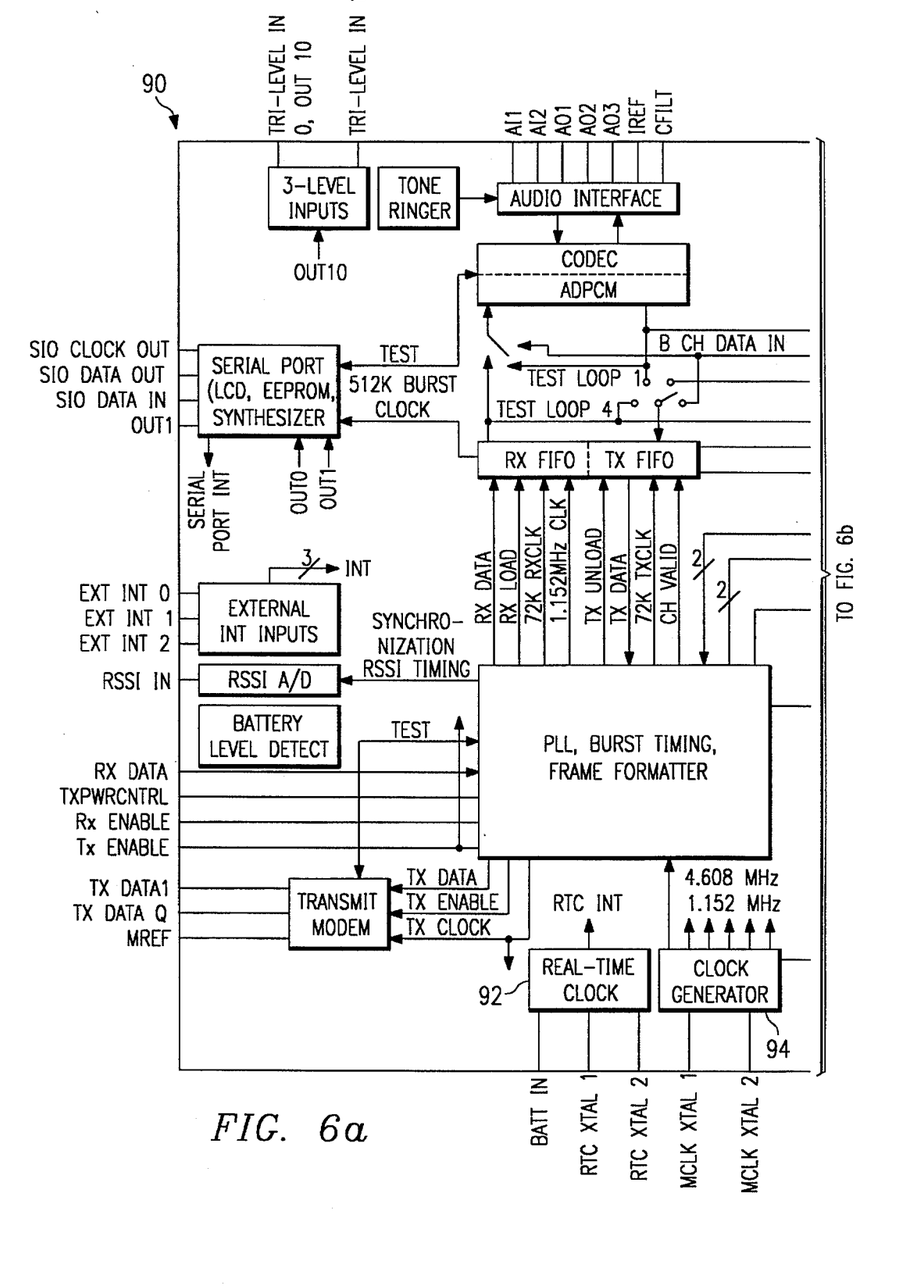
FIG. 6 (which consists of FIG. 6a and FIG. 6b) is a block diagram of a single integrated circuit in which a clock generator and interrupt bypass circuit according to the teachings of the present invention has been implemented along with a microcontroller.
Figure 6B:
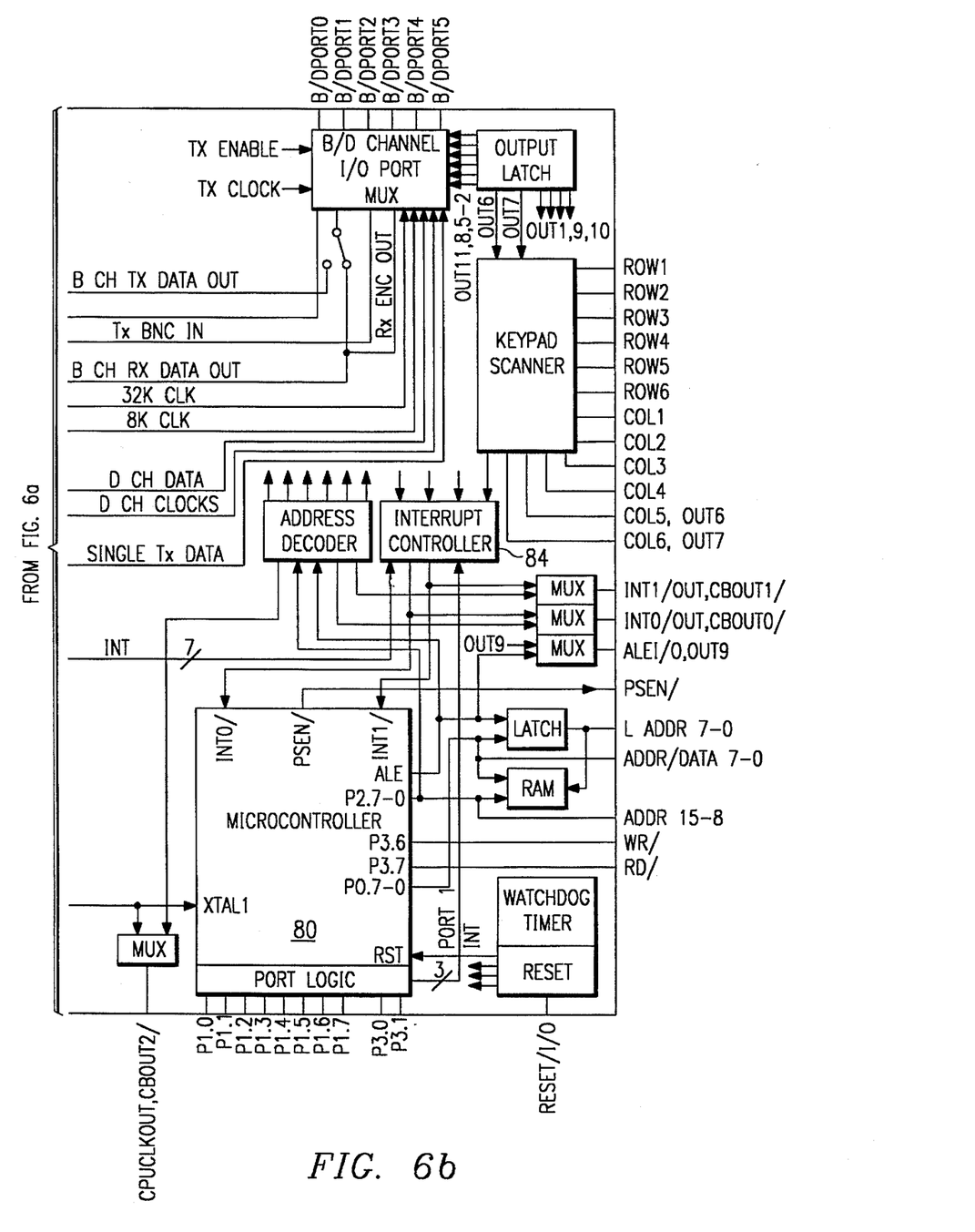

Another possible variation of the system shown in FIG. 1 is the implementation of the clock generator and modules on a single integrated circuit (IC). One such embodiment of such a system is shown in FIG. 6. In this particular embodiment, the clock generator 4 may be used to place all modules on the IC 90 into shut-down mode, with the exception of the Real-Time Clock module 92.

Figure 7:
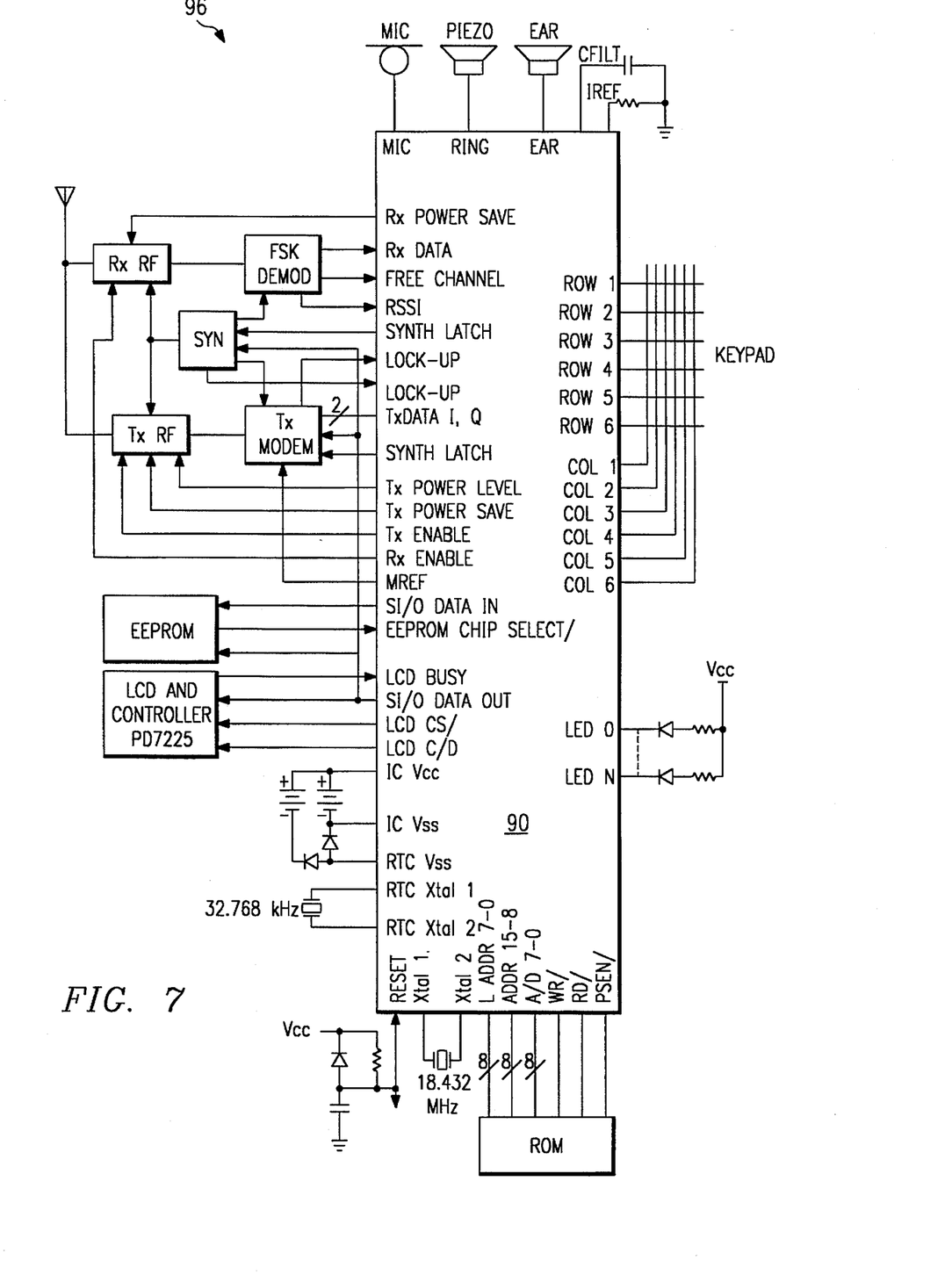
FIG. 7 is a block diagram of a handset unit of a cordless telephone in which an integrated circuit including a clock generator and interrupt bypass circuit according to the teachings of the present invention has been implemented.
Figure 8:
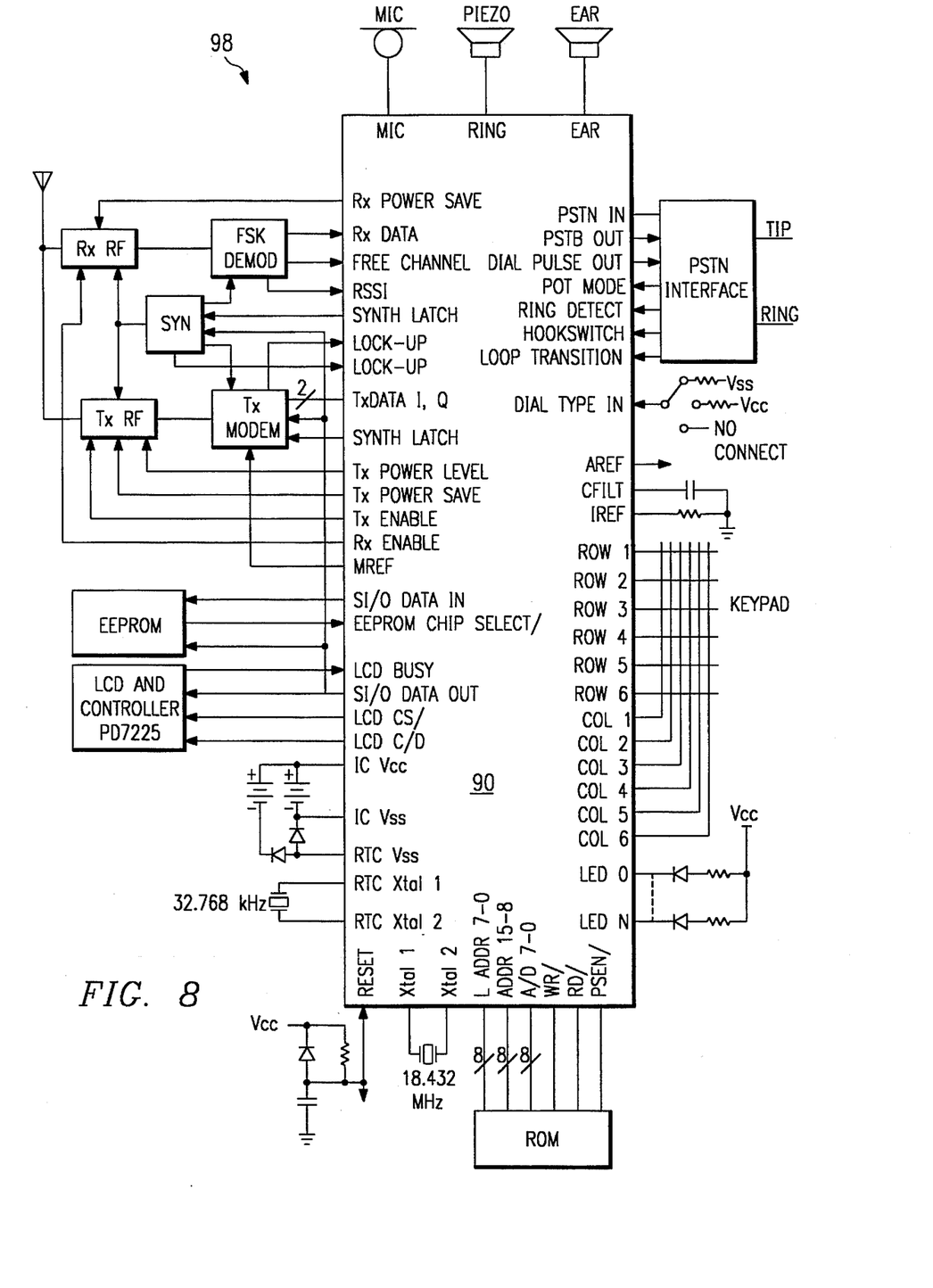
FIG. 8 is a block diagram of a base unit of a cordless telephone in which an integrated circuit including a clock generator and interrupt bypass circuit according to the teachings of the present invention has been implemented.

Furthermore, the IC 90 shown in FIG. 6 may operate in a cordless telephone. The implementation of the IC 90 into the handset unit 96 of a cordless telephone is shown in FIG. 7. The implementation of the IC into the base unit of a cordless telephone 98 is shown in FIG. 8. The clock generator in the IC 90 may be used to place the handset unit 96 or base unit 98 into stand-by mode during idle time, that is the time between uses. When the handset unit or base unit is placed into stand-by mode, it consumes less power than when in the active mode. The conservation of power is important in such a system because the duration of idle time is limited by the life of the battery used to power the handset or base unit. Thus, the capability of the clock generator to place the handset unit or base unit of a cordless telephone into a stand-by mode serves to extend the idle time of the cordless telephone.

What is claimed is:

1. A clock generator for an electrical system, said clock generator capable of providing at least one output clock signal, said clock generator comprising:

means for producing said at least one output clock signal;

means for disabling said means for producing upon reception of a disable activation signal;

means for receiving a shut-down entry request signal;

means for verifying that said received shut-down entry request signal meets a predetermined protocol requirement, said means for verifying comprising at least two registers, said means for verifying generating said disable activation signal upon verification that a received shut-down entry request signal does meet said predetermined protocol requirement, which disable activation signal is conducted to said means for disabling.

2. A clock generator as recited in claim 1, wherein said means for verifying further comprises an interlock mechanism capable of detecting writes to said at least two registers, and wherein one of said at least two registers is a dummy register.

3. A clock generator as recited in claim 2, wherein said interlock mechanism prevents write access to one of said at least two registers unless said predetermined protocol requirement is met.

4. A clock generator as recited in claim 3, wherein said predetermined protocol requirement comprises a predetermined number of writes in a predetermined order to said at least two registers.

5. A method for controlling at least one output clock signal comprising the steps of:

receiving a disable request signal;

stopping said at least one output clock signal after a predetermined length of time after receiving said disable request signal;

receiving an enable request signal; and starting said at least one output clock signal after receiving said enable request signal, wherein said step of stopping said at least one output clock signal comprises the steps of verifying that said disable request signal satisfies a predetermined protocol requirement, and processing said disable request signal only if said disable request signal satisfies said predetermined protocol requirement.

6. A method as recited in claim 5 wherein said step of starting said at least one output clock signal comprises the steps of:

starting a first clock signal; and starting said at least one output clock signal after a delay following said step of starting said first clock signal, said at least one output clock signal being derived from said first clock signal.

7. A method as recited in claim 5 wherein said step of stopping said at least one output clock signal comprises the step of not stopping said at least one output clock signal if said enable request signal is received after receiving said disable request signal and before the expiration of said predetermined length of time.

8. A method as recited in claim 5 wherein the step of stopping said at least one output clock signal comprises the step of stopping said at least one output clock signal after said predetermined length of time following the most recent assertion of said disable request signal.

9. A method as recited in claim 5 further comprising the step of generating said enable request signal in response to at least one interrupt request signal, said enable request signal being generated even if said at least one interrupt request signal has been masked.

\* \* \* \* \*

(12) EX PARTE REEXAMINATION CERTIFICATE (10528th)

United States Patent
Peterson et al.

(10) Number: US 5,502,689 C1
(45) Certificate Issued: Mar. 11, 2015

(54) CLOCK GENERATOR CAPABLE OF SHUT-DOWN MODE AND CLOCK GENERATION METHOD

(75) Inventors: Joseph W. Peterson, Austin, TX (US); Alan F. Hendrickson, Austin, TX (US); Dale E. Gulick, Austin, TX (US); Dean Grumlose, Austin, TX (US)

(73) Assignee: Norman IP Holdings, LLC, Tyler, TX (US)

Reexamination Request:
No. 90/012,784, Feb. 5, 2013

Reexamination Certificate for:
Patent No.: 5,502,689
Issued: Mar. 26, 1996
Appl. No.: 08/201,077
Filed: Feb. 24, 1994

Related U.S. Application Data

(63) Continuation of application No. 07/918,622, filed on Jul. 21, 1992, now abandoned.

(51) Int. Cl.
*G06F 1/32* (2006.01)

(52) U.S. Cl.
CPC ........... *G06F 1/3203* (2013.01); *Y02B 60/1282* (2013.01); *Y02B 60/32* (2013.01)

USPC ............... 368/156; 368/10; 368/66; 368/155; 368/157; 368/200; 368/201; 368/202; 368/203; 368/204

(58) Field of Classification Search
None
See application file for complete search history.

(56) References Cited

To view the complete listing of prior art documents cited during the proceeding for Reexamination Control Number 90/012,784, please refer to the USPTO's public Patent Application Information Retrieval (PAIR) system under the Display References tab.

*Primary Examiner* — Hetul Patel (57) ABSTRACT

A clock generator and interrupt bypass circuit for use in reducing the power consumption of the electrical system in which they are implemented. The clock generator provides module clock signals for sequencing modules within the same electrical system, and is capable of generating those module clock signals when in an active mode, and of not generating those module clock signals when in a stand-by mode. The clock generator is further capable of providing a delay of a predetermined length from a request to enter shut-down mode to actual entry into shut-down mode, allowing time to prepare the electrical system for shut-down mode. The interrupt bypass circuit provides a means of leaving shut-down mode in the event that the relevant interrupt requests have been masked.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 5, 6 and 9 are cancelled.

Claims 1-4 and 7-8 were not reexamined.

\* \* \* \* \*